(12) United States Patent
Varnell et al.

(10) Patent No.: US 8,399,544 B2
(45) Date of Patent: Mar. 19, 2013

(54) ADHESIVE COMPOSITIONS

(75) Inventors: Daniel F. Varnell, Wilmington, DE (US); Bryan K. Spraul, Wilmington, DE (US); Michael A. Evans, Wilmington, DE (US)

(73) Assignee: Hercules Incorporated, Wilmington, DE (US)

( * ) Notice: Subject to any disclaimer, the term of this patent is extended or adjusted under 35 U.S.C. 154(b) by 247 days.

(21) Appl. No.: 13/020,069

(22) Filed: Feb. 3, 2011

(65) Prior Publication Data

US 2011/0190423 A1 Aug. 4, 2011

Related U.S. Application Data

(60) Provisional application No. 61/301,372, filed on Feb. 4, 2010.

(51) Int. Cl.
*C08L 89/00* (2006.01)

(52) U.S. Cl. .............................. 524/25; 524/17; 528/332

(58) Field of Classification Search ...................... 524/25
See application file for complete search history.

(56) References Cited

U.S. PATENT DOCUMENTS

| | | |
|---|---|---|
| 3,197,427 A | 7/1965 | Schmalz |
| 4,853,431 A | 8/1989 | Miller |
| 5,786,429 A | 7/1998 | Allen |
| 5,902,862 A | 5/1999 | Allen |
| 6,222,006 B1 | 4/2001 | Kokko et al. |
| 6,294,645 B1 | 9/2001 | Allen et al. |
| 6,554,961 B1 | 4/2003 | Riehle et al. |
| 6,908,983 B2 | 6/2005 | Maslanka |
| 7,060,798 B2 | 6/2006 | Li et al. |
| 7,252,735 B2 | 8/2007 | Li |
| 2005/0261404 A1 | 11/2005 | Rivers et al. |
| 2005/0282988 A1 | 12/2005 | Li |
| 2008/0050602 A1 * | 2/2008 | Spraul et al. ............... 428/479.6 |
| 2009/0095431 A1 | 4/2009 | Fallmann et al. |
| 2009/0098387 A1 | 4/2009 | Brady et al. |
| 2010/0069534 A1 * | 3/2010 | Wescott et al. ................. 524/25 |

FOREIGN PATENT DOCUMENTS

WO 2005072260 8/2005

OTHER PUBLICATIONS

International Search Report, dated May 11, 2011, p. 1-2.

* cited by examiner

*Primary Examiner* — Doris Lee

(74) *Attorney, Agent, or Firm* — Michael J. Herman; Joanne Rossi; Shaorong Chen

(57) ABSTRACT

The invention is directed to composition, preparation and use of composite materials based on an adhesive with solids levels above 45% by weight that contain stable polyamidoamine-epihalohydrin resins (PAE resins) of solids greater than 40% where the relative high solids of the PAE enables the high solids content of the adhesive. Furthermore, at least 45% of the solids portion of the adhesive is made up of a combination of the solids of the PAE resin and the solids of the protein source. The invention is also directed an adhesive comprised of the PAE in combination with a soy protein source. The invention is also directed toward use of the adhesive in composite materials and in particular wood containing composite materials, and more specifically wood fiber or particle based composites.

27 Claims, No Drawings

US 8,399,544 B2

ADHESIVE COMPOSITIONS

This application claims the benefit of provisional application number U.S. 61/301,372, filed Feb. 4, 2010, the entire contents of which are hereby incorporated by reference.

FIELD OF THE INVENTION

The invention is directed to composition, preparation and use of composite materials based on an adhesive with high solids levels that contain polyamidoamine-epihalohydrin resins (PAE resins). The invention is also directed to the use of the PAE in combination with a soy protein source. The invention is also directed toward use of the adhesive in composite materials and in particular wood containing composite materials.

BACKGROUND OF THE INVENTION

PAE polymers are well-known as wet strength additives in papermaking processes. Technology for using these PAE polymers as curing agent components for protein or lignin-based adhesives is known (US application 2005/0282988). The use of the PAE's with proteins, such as soy flour, soy protein isolate or lignin as adhesives for lignocellulosic is known. (U.S. Pat. No. 7,252,735).

A current limitation of this type of adhesive is often the desirable solids content. In addition PAE resins of high solids content have previously been limited by high viscosity and poor aging stability. There remains in the use of PAE-containing adhesives a need for high solids stable, PAE resins to enable high solids adhesive formulation, which under normal process conditions for a given application, produce strength and adhesive properties in composite samples that are nearly equal to or better than the current low solids PAE based formualtions.

PAE resins with low molecular weight are known (US2007895122A). Such materials result in lower viscosities. However, to obtain low viscosity at a higher solids and retain aging stability requires additional knowledge as discovered in the current invention.

U.S. Pat. No. 5,567,798 (column 6 lines 60-61) teaches that "to prolong shelf life, a residual solids content of 30% or less is preferred." By contrast the PAE resins of the current invention surprisingly are stable to solids of 40% by weight or greater.

U.S. Pat. Nos. 3,197,427, 4,853,431, 6,908,983 B2, and 7291695 B2 teach a low pH, is needed for stability. In the first the pH range is 2.0 to 3.0, in the second it is below 4.2 and most preferably 3.2 to 3.4, in the third it is below 3.3, and in the forth it is below 3.0. Contrary to these and surprisingly PAE resins of higher pH were stable in the current invention. This is even far more surprising considering the high solids of the PAE resins of the current invention, and even more surprising considering the current resins not only have viscosity stability but also stability of high azetidinium group functionality, which as will be noted later, is important.

US patent application 2005/0261404 A1 (paragraph 32 and 33) teaches the possibility of obtaining a high solids suspension of protein material even up to 50%. However, those familiar with protein containing materials know that not all protein sources can be used at such high solids. For example undenatured soy flour when mixed with water can be used up to about 35% solids. Above 35% solids, the viscosity rapidly increases until the material can no longer be stirred, readily mixed or pumped. The viscosity, even with the addition of a viscosity modifier such as sodium bisulfite is high. With a 1% level of sodium bisulfite, on a basis of dry soy flour weight, the viscosity of an aqueous mixture at 30% solids is about 400 cps, at 33% solids it is about 1800 cps, and at 36% solids it is about 20,000 cps. The viscosity continues to increase exponentially with solids. One can not readily mix or pump a soy flour/water mixture above about 36% solids. Therefore, there is a need as shown in the current invention to obtain higher solids through increasing the solids of the PAE component.

US patent application 2005/0261404 A1 (paragraph 21) also limits the formulations of the patent to soy protein free from urease. This is not a necessary requirement for an adhesive based on the combination of a protein source with a PAE resin.

Higher solids adhesives, enabled by higher solids PAE resins, are required in certain applications for successful use and or composite manufacturing. For example in a typical particle board manufacturing process about 93 parts of wood are combined with 7 parts of a urea formaldehyde based adhesive and a typical urea formaldehyde (UF) resin has a solids content of 65%. Those familiar in the art know that employing of substantially lower solids under normal process conditions of a particle board mill will result in a failure to properly internally bond the particle board resulting in defect boards. (see *Modern Particleboard & Dry-Process Fiberboard Manufacturing* by T. M. Maloney, 1977 Miller Freeman Publ.).

Although UF resins are very strong, fast curing, and reasonably easy to use, these resins lack hydrolytic stability along the polymer backbone. This causes significant amounts of free formaldehyde to be released from the finished products (and ultimately, inhaled by the occupants within the home). There have been several legislative actions to push for the removal of these resins from interior home applications (Health and Safety Code Title 17 California Code of Regulations Sec. 93120-93120.12).

Replacement or extension of a UF adhesive is greatly desirable because of the negative environmental impact of formaldehyde. PAE and soy adhesives, such as a PAE/soy flour mixture have previously been made commercially with PAE resins of 20 to 30% solids. The resulting adhesive can not achieve the 65% solids of a UF resin when significant levels of the PAE and soy flour are used under normal conditions. That is high solids has only been obtained by the addition of high levels of low molecular weight components such as urea and glycerol (US patent application 2009/0098387). Useable adhesives with viscosities below 5000 cps such as with a UF resin, in which at least 40 and preferably greater than 50% of the solids composition is a combination of PAE and a protein source such as soy flour, have not previously been realized.

BRIEF SUMMARY OF THE INVENTION

Use of high solids PAE resins lift the achievable solids and active solids of the adhesive. The same is true in other PAE and protein based adhesive systems which compete with adhesives such as UF and phenol formaldehyde.

The invention is directed to composition, preparation and use of composite materials based on an adhesive with solids levels of greater than 45% and preferably greater than 50% that contain high solids polyamidoamine-epihalohydrin resins (PAE resins). The high solids PAE resin of this invention has a solid content of greater than 40% and preferably greater than 43%. Of the solids content of the adhesive, at least 45% and preferably greater than 50% by weight is due to the combined solids of the PAE and protein source. The relative high solids of the PAE enables the high solids content of the adhesive. The PAE useful in the present invention has an aging stability greater than one week at 32° C.

The invention is also directed to the use of the compositions as adhesives for binding wood materials, such as laminates, plywood, particle board, oriented strand board and fiberboard.

Application of the adhesive for various uses such as making engineered wood products and other types of useful materials can be achieved by varied methods known to those skilled in the art. Many such applications benefit from the combination of a high solids and low viscosity adhesive formulation.

DETAILED DESCRIPTION OF THE INVENTION

The invention is directed to composition, preparation and use of an adhesive with solids levels above 45% and preferably greater than 50% by weight that contain polyamidoamine-epihalohydrin resins (PAE resins) of solids greater than 40% by weight and preferably greater than 43%, where the relative high solids of the PAE enables the high solids content of the adhesive and where the PAE also has aging stability greater than one week at 32° C. Furthermore, the solids portion of the adhesive is made up of at least 45% and preferably greater than 50% by weight of a combination of PAE and protein source. The invention is also directed to the use of the PAE in combination with a soy protein source. The invention is also directed toward use of the adhesive in composite materials and in particular wood containing composite materials, and more specifically wood fiber or particle based composites.

The invention is directed towards a high solids adhesive and its uses, the adhesive being comprised of a high solids thermosetting polyamidoamine-epichlorohydrin resin (PAE resin) and protein or lignin. The solids of the PAE resin of the present invention is greater than 40%, preferably greater than 43%. These adhesives are useful for bonding wood and other materials. As required, with respect to current PAE resins, the newly discovered high solids PAE resins must have a lower viscosity at a given concentration, and they must have an aging stability of at least one week at 32° C. Aging stability is defined as the stability of a PAE solution at its given concentration of use and stability means no more than a tripling of viscosity or preferably no more than a doubling of the viscosity. In addition stability means no more than a loss of 20% of its azetidinium groups and more preferably no more than a 15% loss. The higher solids PAE resins may also be classified by molecular weight as determined by RSV and will have an RSV of less than 0.3 dl/g.

Surprisingly, it has been discovered that the dry and wet adhesive properties of adhesive compositions made with a high solids low viscosity stable PAE resin are equivalent to the dry and wet adhesive properties provided by a high molecular weight stable PAE resin. This is in stark contrast to paper applications of PAE resins where high molecular weight has been shown to be required for significantly increased paper strength.

PAE Synthesis

The synthesis of PAE resins is a two step process. A polyamidoamine is first prepared by the polycondensation of a polyamine with a polycarboxylic acid or a polycarboxylic acid derivative. A polycarboxylic acid is an organic compound with at least two carboxylic acid (carboxylate) functional groups. The resulting polyamidoamine is then dissolved in water and is reacted in aqueous solution with epichlorohydrin to prepare the final PAE product. The polyamidoamine is typically prepared by heating a polycarboxylic acid with a polyamine at a temperature of 125-200° C. for 1 to 10 hours while removing the water of condensation produced in the reaction, at atmospheric pressure. Where a reduced pressure is employed, lower temperatures such as 75° C. to 150° C. may be utilized. At the end of this reaction, the resulting product is dissolved in water, at a concentration of about of about 25 to 80% by weight total polymer solids, more typically at a concentration of about 30 to 70% and most typically at a concentration of about 40 to 60%.

A diester can be used instead of a diacid to produce the polyamidoamine. When the diester is used, the polymerization can be conducted at a lower temperature, preferably about 100-175° C. at atmospheric pressure. In this case the byproduct will be an alcohol, the type of alcohol depending upon the identity of the diester. For instance, where a dimethyl ester is employed the alcohol byproduct will be methanol, while ethanol will be the byproduct obtained from a diethyl ester. Where a reduced pressure is employed, lower temperatures such as 75° C. to 150° C. may be utilized.

Typically, dicarboxylic acids and/or derivatives are used for the preparation of polyamidoamines, although polycarboxylic having more than two carboxylate groups may be used. Suitable polycarboxylic acids include but are not limited to malonic acid, glutaric acid, adipic acid, azelaic acid, citric acid, tricarballylic acid (1,2,3-propanetricarboxylic acid), 1,2,3,4-butanetetracarboxylic acid, nitrilotriacetic acid, N,N,N',N'-ethylenediaminetetraacetate, 1,2-cyclohexanedicarboxylic acid, 1,3-cyclohexanedicarboxylic acid, 1,4-cyclohexanedicarboxylic acid, phthalic acid, isophthalic acid, terephthalic acid, iminodiacetic acid, 1,2,4-benzenetricarboxylic acid (trimellitic acid) and 1,2,4,5-benzenetetracarboxylic acid (pyromellitic acid) and mixtures thereof.

Polycarboxylic acid derivatives may also be used to prepare the polyamidoamine. These derivatives can be carboxylate esters, acid halides or acid anhydrides. These derivatives are typically more reactive towards amines than the corresponding carboxylic acid, so the reaction conditions to make polyamidoamines using carboxylic acid derivatives are generally milder than the conditions used to prepare polyamidoamines from polycarboxylic acids and polyamines.

When esters of the polycarboxylic acids are employed to produce the polyamidoamine to make the PAE used in the invention the methyl or ethyl esters are typically used. The alcohol byproduct (methyl alcohol or ethyl alcohol) is distilled off in the synthesis and the synthesis can be performed at a lower temperature than when the corresponding carboxylic acid is used. A strongly basic catalyst such as sodium methoxide can be employed in the synthesis of the polyamidoamines from polycarboxylic esters and polyamines. Particular esters of polycarboxylic acids which are suitable include dimethyl adipate, dimethyl malonate, diethyl malonate, dimethyl succinate, dimethyl glutarate and diethyl glutarate.

Suitable acid anhydrides that may be used to prepare the polyamidoamine include, but are not limited to, succinic anhydride, maleic anhydride, N,N,N',N'-ethylenediaminetetraacetate dianhydride, phthalic anhydride, mellitic anhydride and pyromellitic anhydride and mixtures thereof.

A polycarboxylic acid halide can be reacted with the polyamine to form a polyamidoamine. Particularly suitable are the polycarboxylic acid chlorides. The reaction can be performed at very low temperatures. Appropriate polycarboxylic acid halides can be prepared from polycarboxylic acids by their reaction with thionyl chloride or phosphorus trichloride. Examples include, but are not limited to, adipoyl chloride, glutaryl chloride, and sebacoyl chloride.

A single polycarboxylic acid or derivative thereof may be used in the polyamidoamine synthesis as well as mixtures of polycarboxylic acids. In addition, mixtures of polycarboxylic acids and derivatives of polycarboxylic acids are also suitable for use in this reaction.

A variety of polyamines may be used in preparing the polyamidoamine. These include the general class of polyalkylenepolyamines which can be polyethylene polyamines, polypropylene polyamines, polybutylene polyamines, polypentylene polyamines, polyhexylene polyamines, and mixtures thereof. More specifically, the polyalkylenepolyamines contemplated for use may be represented as polyamines in which the nitrogen atoms are linked together by groups of the formula —$C_nH_{2n}$— where n is a small integer greater than unity and the number of such groups in the molecule ranges from two up to about eight. The nitrogen atoms may be attached to adjacent carbon atoms in the group —$C_nH_{2n}$— or to carbon atoms further apart, but not to the same carbon atom.

This contemplates not only the use of such polyamines as diethylenetriamine, triethylenetetramine, tetraethylenepentamine and dipropylenetriamine, which can be obtained in reasonably pure form, but also mixtures and various crude polyamine materials. For example, the mixture of polyethylene polyamines obtained by the reaction of ammonia and ethylene dichloride, refined only to the extent of removal of chlorides, water, excess ammonia, and ethylenediamine, is a satisfactory starting material. The term "polyalkylenepolyamine" refers to and includes any of the polyalkylenepolyamines referred to above or to a mixture of such polyalkylenepolyamines and derivatives thereof.

Additional polyamines that are suitable for use include, but are not limited to, bis-hexamethylenetriamine (BHMT), N-methylbis(aminopropyl)amine (MBAPA), aminoethylpiperazine (AEP) and other polyalkylenepolyamines (e.g., spermine, spermidine). Preferably, the polyamines are diethylenetriamine (DETA), triethylenetetramine (TETA), tetraethylene-pentamine (TEPA) and dipropylenetriamine (DPTA).

When diamines are used in the synthesis of a polyamidoamine, they do not contribute to amine functionality in the final product, since both ends have reacted to form amide linkages. This has the effect of "diluting out" the amine functionality in the polymer, i.e. the amine equivalent molecular weight is increased. It is desirable, in some cases, to increase the spacing of secondary amino groups on the polyamide molecule in order to change the reactivity of the polyamide-epichlorohydrin complex. This can be accomplished by substituting a diamine such as ethylenediamine, propylenediamine, hexamethylenediamine and the like for a portion of the polyalkylene polyamine. For this purpose, up to about 80% of the polyalkylene polyamine may be replaced by molecularly equivalent amount of the diamine. Usually, a replacement of about 50% or less will serve the purpose.

Similar to adding a diamine in a polyamidaomnine synthesis, aminocarboxylic acids or lactams increase the spacing between amine functional groups without contributing any amine functionality to the polymer. Appropriate aminocarboxylic acids containing at least three carbon atoms or lactams thereof are also suitable for use to increase spacing in the present invention. For example, 6-aminohexanoic acid and caprolactam are suitable additives for this purpose.

Several methods of preparing polyamidoamines have been disclosed that provide control over the polyamidoamine molecular weight and structure. These include the use of monofunctional endcapping agents to control molecular weight, disclosed in U.S. Pat. No. 5,786,429, U.S. Pat. No. 5,902,862 and U.S. Pat. No. 6,222,006, all of which are incorporated by reference. Such use of endcapping agents in the polyamidoamine synthesis is a useful feature that can be incorporated into the polyamidoamines used as starting materials in this invention. For example, when preparing an end-capped polyamidoamine one may replace a portion of the diacid with a monofunctional acid and/or may replace a portion of the polyamine with a monofunctional amine.

Various procedures, conditions and materials can be utilized to produce endcapping when preparing the polyamidoamine including conventional procedures, conditions and materials, and include those described herein. Starting with, for example, an equimolar mixture of dicarboxylic acid and polyalkylenepolyamine, for every 1 mole of diacid or polyalkylenepolyamine removed a quantity of preferably about 2 moles of monofunctional carboxylic acid or monofunctional amine endcapper is used.

One can control the molecular weight of a condensation polymer by adjusting the relative amounts of bifunctional and monofunctional reactants (endcappers) in the system. The theory of molecular weight control and the effect of monofunctional additives for condensation polymer is well known. The $DP_n$ is defined as the number-average degree of polymerization or the average number of monomer units in a polymer chain. Equation 1 defines the $DP_n$ in terms of the molar ratios of the components, assuming complete reaction of all functional groups.

$$DP_n=(1+r)/(1-r) \quad [1.]$$

where r is defined as the ratio of the monomer units and is calculated as follows:

$$r=A/(B+2C) \quad [2.]$$

A and B are the difunctional monomer components and C is the monofunctional component (end-capper). The quantity r will always be less than 1.

A controlled molecular weight product is prepared by using specific amounts of a monofunctional reactant. The composition may be defined in terms of a polyamidoamine prepared from A parts dicarboxylic acid, B parts polyalkylenepolyamine and C parts monofunctional endcapping moiety, all parts given as molar quantities.

When A>B the endcapping moiety will be a monofunctional amine and C will equal about 2(A−B). When B>A the endcapper will be a monofunctional acid and C will be equal to about 2(B−A). For this case Equation [2.] is rewritten as:

$$r=B/(A+2C) \quad [3.]$$

Preferably, the polyamidoamines have a range of $DP_n$ of from about 3 to less than 50, more preferably a range of from about 3 to 40, and most preferably a range of $DP_n$ is from about 3 to 30.

Various temperatures and reaction times can be utilized in the reaction to produce the polyamidoamine. Temperatures of between about 125° C. and 260° C. are preferred, more preferably between about 155° C. and 200° C., and the reaction mixtures are maintained at these temperatures for preferably between about 2 to 12 hours, more preferably between about 2 to 6 hours.

Suitable monofunctional amines used as endcappers include, but are not limited to, monofunctional primary amines, including monoalkyl amines and monoalkanolamines, and monofunctional secondary amines, including dialkylamines and dialkanolamines.

Monofunctional primary amines include, but are not limited to butylamine, ethanolamine (i.e., monoethanolamine, or MEA), cyclohexylamine, 2-methylcyclohexylamine, 3-methylcyclohexylamine, 4-methylcyclohexylamine, benzylamine, isopropanolamine (i.e., monoisopropanolamine), mono-sec-butanolamine, 2-amino-2-methyl-1-propanol, tris (hydroxymethyl)aminomethane, tetrahydrofurfurylamine, furfurylamine, 3-amino-1,2-propanediol, 1-amino-1-deoxy-D-sorbitol, and 2-amino-2-ethyl-1,3-propanediol. Monofunctional secondary amines include, but are not limited to, diethylamine, dibutylamine, diethanolamine (i.e., DEA), di-n-propylamine, diisopropanolamine, di-sec-butanolamine, and N-methylbenzylamine.

Monofunctional carboxylic acids suitable for the endcapped polyamidoamine include, but are not limited to, benzoic acid, 2-hydroxybenzoic acid (i.e., salicylic acid), 3-hydroxybenzoic acid, acetic acid, phenylacetic acid, propionic acid, butyric acid, valeric acid, caproic acid, caprylic acid, 2-ethylhexanoic acid, oleic acid, ortho-toluic acid, meta-toluic acid, and para-toluic acid, ortho-methoxybenzoic acid, meta-methoxybenzoic acid, and para-methoxybenzoic acid.

Monofunctional carboxylic acid esters suitable for the endcapped polyamidoamine include, but are not limited to, methyl acetate, ethyl acetate, methyl benzoate, ethyl benzoate, methyl propionate, ethyl propionate, methyl butyrate, ethyl butyrate, methyl phenyl acetate, and ethyl phenyl acetate.

The volatility of the endcapping agent should be low enough so that the endcapping agent remains in the polymerization reaction at the temperature at which the reaction is being conducted. Particularly, when the polyamidoamine is prepared by thermally driven polycondensation, volatility is a significant feature of the endcapping agent; in this instance, an endcapping agent of lesser volatility is preferred. The boiling point of the endcapping agent should be high enough so that, at the temperature being employed to drive off the condensation product—i.e., water where a diacid reactant is used, and alcohol in the case of diester—the agent is not also removed.

Another technique for controlling the molecular weight of a polyamidoamine is taught in U.S. Pat. No. 6,908,983 and U.S. Pat. No. 6,554,961, both of which are herein incorporated by reference in their entireties. An amine excess is used to provide amine terminated materials. The amine termination has the effect of increasing the amine content of the polyamidoamine and also limits the molecular weight. As the amine excess is increased, the amine content of the polyamidoamine increases and the molecular weight decreases. This technique is generally referred to herein as "amine excess reaction", "amine excess polyamidoamine" or "amine excess polymer". It is contemplated that an amine excess prepared polyamidoamine can be used to prepare the PAE resins of the present invention.

Polyamidoamines disclosed in U.S. Pat. No. 6,294,645, which is herein incorporated by reference, include endcapped materials and polyamidoamines in which the molecular weight is controlled by the extent of reaction. The molecular weight of a polyamidoamine can be controlled by controlling the amount of distillate (water) removed during the polycondensation reaction of a dibasic acid and a polyamine. In accordance with well known principles of polymer chemistry, the molecular weight increases with increasing extent of reaction and amount of distillate produced. Lower molecular weights can be achieved by stopping the reaction before the theoretical amount of distillate has been produced.

The second step in the synthesis of a PAE resin or polymer is the reaction of the polyamidoamine with epichlorohydrin to form a thermosetting cationic resin. The preparation of thermosetting PAE resins is well known.

The synthesis of the PAE resin is typically conducted in aqueous solution. To convert the polyamidoamine to a cationic thermosetting resin, the polyamidoamine is reacted with epihalohydrin, preferably epichlorohydrin, at a temperature from about 25° C., to about 100° C. and preferably between about 35° C. to about 70° C. This reaction is preferably carried out in aqueous solution to moderate the reaction. Although not necessary, pH adjustment can be performed to increase or decrease the rate of crosslinking.

When the desired reaction endpoint is reached, sufficient water can be added to adjust the solids content of the resin solution to the desired amount and the product can be cooled to ambient temperature and then stabilized to permit storage by improving the viscosity and azetidinium stability by adjusting the pH to between 6.5 and 4.0 and more preferably between 6 and 4.2 and most preferably between 5.5 and 4.5. Any suitable inorganic or organic acid may be used to stabilize the product, preferably sulfuric acid. Likewise, pH may be increased by any suitable inorganic or organic base, preferably sodium hydroxide. Typically, in order to achieve stability the pH of the resin solution must be lowered as the resin solids are increased. (US 2009/0036577 paragraph 8).

In the polyamidoamine-epichlorohydrin reaction, it is preferred to use sufficient epichlorohydrin to convert most of the primary and secondary amine groups to tertiary amine groups. For polyamidoamines that contain tertiary amine groups, it is preferred to use sufficient epichlorohydrin to convert most of the tertiary amine groups to quaternary amine groups. However, more or less may be added to moderate or increase reaction rates. More traditional PAE resins are obtained by utilizing from about 0.35 to 0.65 parts of epichlorohydrin per part of polyamidoamine. It is preferred in the current invention to utilize 0.7, 0.75, 0.8, 0.85, 0.90 to 1.0 1.1, 1.2, 1.3 parts of epichlorohydrin per part of polyamidoamine. It is preferred for the current invention to utilize from 0.7 to 1.3 parts of epichlorohydrin per part of polyamidoamine and more preferable from 0.75 to 1.2 parts and most preferable from 0.8 to 1.1 parts of epichlorohydrin per part of polyamidoamine.

Epichlorohydrin is the preferred epihalohydrin for use in the present invention. The present application refers to epichlorohydrin specifically in certain instances, however, the person skilled in the art will recognize that these teachings apply to epihalohydrin in general.

Higher molecular weight is known to give greater strength characteristics in paper. This teaching is in contrast to the present invention. In the present invention, the development of high molecular weight is not a desirable feature and measures are taken to prevent significant molecular weight increase from occurring. The main focus of the polyamidoamine-epichlorohydrin reaction as performed in the current invention is to functionalize the polyamidoamine with epichlorohydrin and generate the desired reactive functionality (aminochlorohydrin and/or azetidinium) without incurring an appreciable increase in molecular weight which would limit the solids of the final resin.

It is desirable in the current invention to carry the epichlorohydrin reaction to a point that provides a level of azetidinium functionality greater than about 0.75 meq/g. Milliequivalencies are calculated by meq/g=(mole of AZE)/(g of resin)*1000. Moles of AZE present in the resin is determined by NMR.

A single cook step can be used for the polyamidoamine-epichlorohydrin reaction or a two step process can be used for the preparation of the low molecular weight PAE resin. In the single step process, epichlorohydrin is added to an aqueous solution of polyamidoamine and is allowed to react at a temperature of 35-70° C. An acid may be added to lower the pH of the reaction mixture and control the molecular weight increase of the PAE resin. Any suitable inorganic or organic acid may be used to stabilize the product. Examples include, but are not limited to hydrochloric acid, sulfuric acid, methanesulfonic acid, nitric acid, formic acid, phosphoric and acetic acid. The reaction is stopped by cooling, addition of dilution water and stabilization with an added acid before the resin develops any significant increase in molecular weight.

A two-step process can be employed in order to better control the reaction and to reduce the levels of epichlorohydrin byproducts in the final product. The first step of this process is performed at low temperature (10-45° C.) and is referred to as the alkylation step. In this low temperature step epichlorohydrin reacts with amine groups in the polyamidoamine to form aminochlorohydrin functional groups. Epichlorohydrin is added to an aqueous solution of the polyamidoamine (typically 30 to 55% total polyamidoamine solids before adding epichlorohydrin) and maintaining the reaction temperature at 10-45° C. for 1 to 12 hours. During this time water may be added to slow the rate of crosslinking. After the alkylation step the reaction is heated to 50-80° C. to convert the aminochlorohydrin functional groups to azetidinium functional groups. Depending on the molecular weight of the polyamidoamine and the desired cook time, a mineral acid ($H_2SO_4$) may be added to adjust the pH (4.0-6.0) to reduce the rate of polymer crosslinking. This is typically done at 50-55° C., however it could be done at an earlier point in the reaction or at a later point in the reaction.

A PAE prepared with a high molecular weight prepolymer, or reacted with insufficient epichlorohydrin, or reacted to too low or too high of a molecular weight, or with insufficient azetidinium groups will not be useable at a high solids because of excess viscosity or insufficient aging stability or insufficient reactivity.

Inasmuch as the upper solids of a liquid adhesive composition is determined by the solids of the components. The solids and viscosity of a PAE resin is determined predominantly by the molecular weight. Molecular weight of the PAE can also be expressed by a Reduced Specific Viscosity (RSV). The molecular weight of the PAE resins of the current invention will have solids content greater than 40% and a viscosity at 40% solids in water of less than 200 cps. Such PAE resins will have an RSV of less than 0.3 dl/g. These low mol. weight or low viscosity PAE's are to be differentiated from high molecular weight PAE's of the art which have RSV values above 0.3 dl/g. Typical PAE resins have an RSV greater than 0.3 dl/g because higher molecular weights are needed in paper applications for the development of strength. PAE resins of RSV values below 0.3 dl/g have not been used with commercial success for strength applications in paper. Furthermore, to be most effective as an adhesive it is desirable that the PAE resin of the adhesive, at the time of use, should have an azetidinium level greater than 0.75 meq/g of resin, or more preferably greatly than 1.5 meq/g and most preferably greater than 2 meq/g.

The molecular weight of the PAE resin used in the present invention can be characterized by RSV and is less than 0.3 dl/g more preferable less than 0.25 dl/g and most preferably less than 0.2 dl/g as measured at 2% concentration in 1N ammonium chloride at 25° C. RSV is a measurement of a polymer's solution viscosity that correlates directly to its molecular weight.

The viscosity of the PAE is defined as the of Brookfield viscosity, the viscosity at 40% solids aqueous solution of the PAE resin will be less than 200 cps.

The pH of the PAE resin is greater than 4.0 and less than 6.5. Preferably greater than 4.2 and less than 6.0 and most preferably greater than 4.5 and less than 5.5.

The azetidinium level must be greater than 0.75 meq/g, more preferably greater than 1.5 and most preferably greater than 2 meq/g.

The aging stability must be such that the viscosity less than triples when stored for a week at 32° C. and more preferably less than doubles in that time.

In one embodiment of the invention the low molecular weight polymer is obtained by using an excess of polyalkylenepolyamine in the synthesis. This involves employing a reaction mixture wherein the ratio of total number of amine groups from the polyamine to the total number of carboxylic acid groups form the polycarboxylic acid is greater than 1 which results in a polyamidoamine with a preponderance of amine endgroups. The stoichiometry of polyamine to polycarboxylic acid, e.g., diethylenetriamine to adipic acid, can range from greater than about 1.0:1.0, on a molar basis, to 1.7:1.0, more preferably, greater than about 1.01:1.0 to 1.4:1.0. Using an excess polyamine results in polyamidoamines having lower molecular weights than one would obtain by reacting an equimolar mixture under the same conditions. The polyamidoamines have a range of $DP_n$ of from about 3 to 50, more preferably a range of from about 3 to 40, and most preferably a range of $DP_n$ is from about 3 to 30. The poly amidoamine is then reacted with epihalohydrin. It is preferred in the current invention to utilize 0.7, 0.75, 0.8, 0.85 0.90 to 1.0, 1.1, 1.2, 1.3 parts of epichlorohydrin per part of polyamidoamine.

Preparation of Adhesives

Adhesive compositions of the present invention are prepared by combining the high solids PAE resin with a protein and/or lignin. Suitable sources of protein include, but are not limited to, soy protein, blood meal, feather meal, keratin, gelatin, collagen, gluten, spirulina, and casein. The protein may be pretreated or modified to improve its solubility, dispersability and/or reactivity. U.S. Pat. No. 7,060,798, the entire content of which is herein incorporated by reference, teaches methods of modifying protein and their incorporation in to an adhesive.

In one embodiment of the invention a method of preparing an adhesive is disclosed. The method comprising combining a PAE resin with a protein source, wherein the adhesive has a total solids content of greater than 45% by weight based on the total weight of the adhesive, wherein the combined solids content of the PAE resin and protein source comprises a least 45% of the total adhesive solids content, wherein the RAE resin has a solids content of greater than 40%, and wherein the RAE resin is characterized in that it has an aging stability of greater than one week at 32° C.

Another embodiment of the invention is the adhesive comprising a RAE resin and a protein source, wherein the adhesive has a total solids content of greater than 45% by weight based on the total weight of the adhesive, wherein the combined solids content of the PAE resin and protein source comprises a least 45% of the total adhesive solids content, wherein the PAE resin has a solids content of greater than 40%, and wherein the PAE resin is characterized in that it has an aging stability of greater than one week at 32° C.

One particularly useful source of protein for the current invention is soy. Soy protein can commonly be obtained in the form of soy flour (about 50 wt. % protein, dry basis), soy protein concentrate (about 65 wt. % protein, dry basis) and soy protein isolate (SPI, at least about 85 wt. % protein, dry basis). The soy source useful in the current invention can contain urease.

The present invention yields useable aqueous soy/PAE adhesives regardless of the MI of the soy flour used. The Protein Dispersibility Index (PDI) is a means of comparing the solubility of a protein in water, and is widely used in the soybean product industry. A utility of the present invention is that the soy/PAE adhesive can use either high or low PDI soy flour to yield useable adhesives.

Lignin may be an industrial lignin such as Kraft lignin, obtained from the Kraft process of making cellulose pulp from wood.

The combination of high solids PAE resin and protein containing material and/or lignin is prepared as an aqueous mixture wherein the components are combined and mixed with additional dilution water if required. Other additives may be included in the adhesive formulation such as extenders, viscosity modifiers, defoamers, biocides, and fillers such as wheat flour, tree bark flour, nut shell flour and corn cob flour. The components of the adhesive formulation are combined in a suitable mixer and are stirred until a homogeneous mixture is obtained.

For the current invention the adhesive compositions are prepared with a solids of greater than 45% and more preferably greater than 50%. Furthermore, the solids portion consists of at least a combined PAE and protein source solids content of at least 45% based on total solids, preferably greater than 50% by weight and more preferably greater than 55%. For way of illustration only, in a 200 gram, 50% solids adhesive sample: up to 100 grams may be water; of the 100 grams that are not water, at least 50 grams must be from the combined weight of the PAE solids and the protein source. The remaining 50 grams of solids can be from PAE, protein source, fillers, diluents or other solids. Coadditives or fillers, as known to those skilled in the art, may be incorporated to increase the overall solids. The most effective ratio of PAE resin to protein containing material and/or lignin in the adhesive composition will depend on the substrate being bonded, the type of protein source and/or lignin used and the physicochemical properties of the PAE resin. The ratio of protein source and/or lignin to PAE resin used in adhesive formulations will be preferably in the range of 95:5 to 20:80, preferably 93:7 to 50:50 and more preferably in the range of 90:10 to 35:65 and most preferably in the range of 80:20 to 45:55.

The adhesive mixtures have been found to work over a pH range of 4 to 9 and it is more preferable to work in the range of 4.5 to 8, and most preferable to work in the range of 5 to 7.

The adhesive compositions are thermosetting materials and as such are cured by the application of heat and optionally, pressure. Typical temperatures for curing the adhesive compositions are in the range of 50 to 250° C., more preferably in the range of 80 to 200° C. and most preferably in the range of 100 to 170° C. Curing times at these temperatures can range from 30 seconds to one hour, more preferably from one minute to 30 minutes and most preferably from 2 minutes to 10 minutes.

Use of Adhesives

The adhesive composition can be added to a suitable substrate in the range of 1 to 25% by weight, preferably in the range of 1 to 15% by weight and most preferably in the range of 2 to 10% by weight. Examples of some suitable substrates include, but are not limited to, a lignocellulosic material, pulp or glass fiber. The adhesive composition can be applied by the use of roller coating, knife coating, extrusion, curtain coating, foam coaters and spray coaters or other means. Use of a high solids PAE that has a low viscosity aids in such coating/treatment processes. Lower viscosity allows for smooth and even distribution of the adhesive on the substrate and higher solids provides a higher concentration of active material for a given level of coating or treatment.

Use of adhesives to prepare lignocellulosic composites is known in the art. A number of materials can be prepared using the adhesive composition of the invention including particleboard, oriented strand board (OSB), waferboard, fiberboard (including medium-density and high-density fiberboard), parallel strand lumber (PSL), laminated strand lumber (LSL) and other similar products. Lignocellulosic materials such as wood, wood pulp, straw (including rice, wheat or barley), flax, hemp and bagasse can be used in making thermoset products from the invention. The lignocellulosic product is typically made by blending the adhesive with a substrate in the form of powders, particles, fibers, chips, flakes fibers, wafers, trim, shavings, sawdust, straw, stalks or sheaves and then pressing and heating the resulting combination to obtain the cured material. The moisture content of the lignocellulosic material are typically in the range of 2 to 20% before blending with the adhesive composition.

There are limitations on the moisture content of the final composite materials. Too much moisture in the final composite composition can result in inferior products that don't meet the required specification or can result in problems in curing to a finish product (for example to much steam generated when heating to cure the adhesive). Therefore it is beneficial to have a lower moisture, higher solids adhesive so that the final composite composition can remain within the moisture contents limits even if the moisture content of the wood is high. In addition this saves energy costs of drying the wood to a lower specification of moisture to ensure that the final product does not exceed the limits of moisture. Using a high solids PAE resin in preparing the high solids adhesive allows for lower moisture being added to the final composite material. The higher the moisture content of the wood versus the limitations of moisture in the final furnish the more beneficial is a high solids adhesive and thus the more beneficial is a high solids PAL resin.

The adhesive compositions also may be used to produce plywood or laminated veneer lumber (LVL). The adhesive composition may be applied onto veneer surfaces by roll coating, knife coating, curtain coating, or spraying. A plurality of veneers are then laid-up to form sheets of required thickness. The mats or sheets are then placed in a heated press (e.g., a platen) and compressed to effect consolidation and curing of the materials into a board. Fiberboard may be made by the wet felted/wet pressed method, the dry felted/dry pressed method, or the wet felted/dry pressed method.

For use in particle board the adhesive of the current invention should have a viscosity below about 10,000 cps (as measured by an RV Brookfield viscometer). More preferably below 7000 cps and most preferably below 5000 cps.

In addition to lignocellulosic substrates, the adhesive compositions can be used with substrates such as glass wool, glass fiber and other inorganic materials. The adhesive compositions can also be used with combinations of lignocellulosic and inorganic substrates.

Preparation of the current adhesive can be part of the fabrication of particle board. A typical particle board process consists of preparing a 65% solids UF based adhesive and mixing such adhesive with the particle board wood furnish. The typical ratio of adhesive to wood is about 7 to 93 on a weight basis. The adhesive and wood are mixed and then formed into sheets which are compressed and then hot pressed. The typical oven temperature 1 press temperature is 170° C. and the typical time at temperature and pressure is about 3 to 5 minutes. The typical moisture content of the wood plus adhesive prior to pressing is between 8 and 12% by weight. The adhesive of the present invention, which does not contain formaldehyde, can be used as a substitute for the UF based adhesives. Resulting in a more environmentally friendly product without substantially affecting the process by which the composite material, such as particle board, is made. The adhesive of the present invention, which does not contain formaldehyde, can also be used as an extender for UF (urea formaldehyde), MF (melamine formaldehyde) or MUF (melamine urea formaldehyde) based adhesives.

EXAMPLES

Example 1

A low molecular weight high solids polyamide was prepared by combining 109.28 parts diethylene triamine (DETA) (high purity grade) (109.28 g, 1.06 mol) and adipic acid (120.0 g, 0.819 mol). The DETA was added to a flask, and while stirring, the adipic was slowly added over about 50 minutes. Heat was then applied and the temperature was slowly and steadily increased to 175° C. over 140 minutes. The temperature was then held at 170° C. for 150 minutes. During the heating and hold time, water was separated from the reaction and collected with a condensing column/Dean-Stark. Water (29.6) was collected. At the end of the hold at 170° C. water (360 g) was added slowly to cool and thin the material. The final polymer solution had a solids of 60.3%. The RSV was 0.077 dl/g. The acid and amine contents were 0.131 and 4.75 meq/g. (see below for RSV method).

The above polyamide (180.6, 0.84 moles of amine groups theoretically and 0.86 moles amines experimentally) and water (37.2 g) were added to a flask. While stirring epichlorohydrin (88.8 g, 0.96 moles) was added over 10 minutes. Temperature began to rise and was held at 40° C. with heating and cooling for 110 minutes. After that that time water (111.9 g) was added. The temperature was then increased to 70° C. over 70 minutes and held at 70° C. for 150 minutes. The viscosity, by the Gardner Holt method and standards, increased during the hold time from about a "C" to a "G". The pH dropped to 4.69. Water (24.3 g) was added and the solution was cooled to room temperature. The final material had a solids content of 44.5%, a Brookfield viscosity of 96 cps at the 44.5% solids and a pH of 4.95. The azetidinium level was approximately 92.3 mole % versus the adipic acid repeat units as measured by NMR. The azetidinium level could also be expressed as meq/g if one knows the moles of functional groups per gram.

In the current prepolymer the theoretical adipic acid level is 2.3 meq/g and based on this the azetidinium level would be 2.1 meq/g. The level of adipic acid is only an approximation and it is easier to rely on an NMR measured values for characterization.

After 3 weeks of aging at room temperature the azetidinium level dropped to 88.4 mole % of the adipic acid units, a loss of 9.6%.

A mixture of water (135.14 g), soy flour (Prolia 200/90), sodium meta bisulfite, glycerol and dimethylurea in a ratio of 300 to 200 to 1 to 200 to 150. The soy mixture had a solids content of 64.75%. The PAE resin (39.33 g of solids) was combined with mixture to create the adhesive. This adhesive mixture was stirred for 5 minutes to make it uniform and had a solids content of 60.19% and a Brookfield viscosity of 2799 cps. 45% of the adhesive solids are from the PAE and soy flour. The pH was 6.94. The material was sprayed uniformly onto a particle board face furnish and mixed with high shear for 1 minute to obtain a uniform treatment of the wood. The amount of wood (including its 5.1% moisture) was 536.01 g. The amount of adhesive used was 88.98 g. The treated wood was formed into a uniform layer and pressed slightly to compact and the pressed in a 170° C. press to a thickness of ½ inch. The hot press time was 3 minutes. The pressed, now hard cured composite, was removed, cooled, aged for a day at 50% humidity, and cut into 1 inch by 8 inch by ½" samples. The average density of the samples was 44.58 pounds per cubic foot. The modulus of rupture (MOR) was determined in a 3 point bend test.

A control sample was prepared in the same way except in place of the above PAE resin a commercial high molecular weight low solids resin (Ashland product CA1300) was used. 58.33 g of the 30% solids commercial material was used with 135.14 g of the soy mixture. The adhesive pH was 7.12, it had a solids of 54.27%, and a Brookfield viscosity of 3649 cps. The average density of the hot pressed samples was 45.15 pounds per cubic foot (PCF). Preparation of a particle board on a commercial scale would be difficult if not impossible with the lower solids level where typically a 65% solids UF resin is used. Using a lower solids resin at equivalent add-on rate causes "blows" and other board defects due to the high moisture content in the board, which leads to high internal gas (steam) pressure.

The average MOR of 8 samples from the commercial material was 1658 psi with a standard deviation of 218 psi. The average MOR of 8 samples from the high solids PAE sample was 1756 psi with a standard deviation of 177. The MOR of the commercial sample and the high solids PAE, sample was 1596 psi and 1696 respectively when interpolated to 44 PCF. The high solids PAE material was no worse in MOR than the commercial low solids material. This shows that the inventive adhesive provides equivalent or better performance then the low solids product while significantly reducing the problems caused by excess moisture.

RSV is measured by the following means. A 2% solution of the polymer was prepared in 1 N ammonium chloride. The RSV was measured at 25.0° C. by means of a Cannon automated capillary viscometer. A PolyVISC or AutoVISC model viscometer can be used for this purpose, both of which are available from Cannon Instrument Company, State College, Pa. Flow times of the 2% polymer solution and the pure solvent are measured and the relative viscosity (Nrel) calculated. The reduced viscosity is calculated from the relative viscosity, and the reduced specific viscosity is calculated by dividing the reduced viscosity by the solution concentration. At 22° C.

Example 2

In a 1 L 4 neck round bottom flask a polyamidoamine (493.63 g) made from diethylenetriamine (DETA) and adipic acid was charged. The polyamidoamine was prepared from a 1.13:1 molar mixture of diethylenetriamine and adipic acid, and had a total solids content of 49.43% solids in water. The reduced specific viscosity of a 2% solution of the polymer in 1N ammonium chloride was between 0.100 and 0.115 dL/g as determined at 25° C. by means of a Cannon automated capillary viscometer as described above. At 20° C., water (190.23 g) was added followed by epichlorohydrin (195.77 g) added over a 20 minutes period of time, and the reaction was heated to 40° C. The reaction was held at that temperature for 180 minutes from the end of epichlorohydrin addition. After the 180 minutes water (97.64 g) was added to dilute the reaction to 45% Total solids and the reaction was then heated to 65° C. Once the reaction reached 57.5° C. concentrated sulfuric acid (8.41 g) was added to adjust the reaction pH to 7.09. The reaction was held at 65° C. until the reaction temperature had been >64° C. for 90 minutes. At that time sulfuric acid (2.18 g) was added to adjust the pH to 4.98. Total solids 44.1%, Brookfield viscosity 71.2 cps. Brookfield viscosity was measured at 25° C. at 60 rpm with a #61 spindle using a Brookfield LV DV-II+Pro.

20 parts of PAE based on solids from the above PAE solution at 44.1% solids was combined with 100 parts on a dry basis of a soy flour mixture containing 1.33 parts glycerol for every 1 part soy and having a solids of 61%. The soy mixture also contained in minor amounts sodium bisulfite as a viscosity aid. The adhesive also contained a defoamer, and biocide. The resulting PAE/soy flour adhesive had a solids content of 57.3%. Of the solids content, 52.4% is from the combined weight of PAE resin and soy flour. For comparison the same mixture was made with a lower solids, higher molecular weight, higher viscosity PAE known as CA1300 from Ashland. The adhesive formed had a solids content of 52.0%. Both adhesives were mixed with a particle board face furnish with 5.1% moisture content. In both cases 8 parts of adhesive on a dry basis was added to 100 parts of wood on a dry basis. The resulting board furnishes had moisture contents of 9.3 and 10.4% prior to fabrication. ½ inch boards were formed from each furnish with the same level of wood to gives boards with average densities of about 44 pounds per cubic foot. Both furnishes were hot-press for 4 minutes with a press temperature of 170° C. Inner board temperature reached approximately 120° C. for about 2 minutes. The modulus of rupture (MOR) and inner bond strength (IB) were measures. The sample with the high solids PAE gave MOR strengths of 1890+/−31 psi and 125+/−24 psi for IB. The sample with the lower solids PAE resin gave MOR strengths of 1794+/−45 psi and 80+/−16 psi for IB. Furthermore, the viscosity of the adhesive with the high solids PAE of the current invention was 2050 cps (Brookfield, spindle 64, 12 rpm) and had a pH of 5.93; whereas, the low solids PAE based adhesive had a viscosity of 3749 cps and a pH of 5.61. With the current invention a lower viscosity adhesive of considerably higher solids and at equal properties was obtained versus current commercial PAE chemistry.

Example 3

A 1 L 4 neck round bottom flask was charged with a polyamidoamine (190.23 g) made from diethylenetriamine (DETA) and adipic acid. The polyamidoamine was prepared from a 1.13:1 molar mixture of diethylenetriamine and adipic acid, and had a total solids content of 42.1% Total solids in water. The reduced specific viscosity of a 2% solution of the polymer in 1N ammonium chloride was between 0.100 and 0.115 dL/g as determined at 25° C. by means of a Cannon automated capillary viscometer as described above. At 21.3° C., water (65.16 g) was added followed by epichlorohydrin (122.38 g) added over a 20 minute period of time, and the reaction was heated to 40° C. The reaction was held at that temperature for 180 minutes from the end of epichlorohydrin addition. After the 180 minutes water (35.09 g) was added to dilute the reaction to 47% Total solids and the reaction was then heated to 65° C. Once the reaction reached 53.7° C. concentrated sulfuric acid (4.33 g) was added to adjust the reaction pH to 5.56. The reaction was held at 65° C. until the reaction temperature had been >64° C. for 90 minutes. Material set aside for aging was adjusted to pH 5. Total solids=46.95%, Brookfield viscosity 118 cps. Brookfield viscosity was measured at 25° C. at 60 rpm with a #61 spindle using a Brookfield LV DV-II+ Pro.

|  | Aging at 25° C. | | Aging at 32° C. | |
| --- | --- | --- | --- | --- |
| Days | Visc | pH | Visc | pH |
| 0 | 118 | 5 | 118 | 5 |
| 7 | 112.5 | 5.12 | 178 | 5.09 |
| 14 | 149.5 |  | 191.5 |  |
| 21 | 175 |  | 234 |  |
| 35 | 245 | 5.09 | 360 | 4.96 |

The PAE resin of this example has high solids, low viscosity, and acceptable aging stability.

Example 4

A 1 L 4 neck round bottom flask was charged with a polyamidoamine (122.38 g) made from diethylenetriamine (DETA) and adipic acid. The polyamidoamine was prepared from a 1.13:1 molar mixture of diethylenetriamine and adipic acid, and had a total solids content of 42.1% Total solids in water. The reduced specific viscosity of a 2% solution of the polymer in 1N ammonium chloride was between 0.100 and 0.115 dL/g as determined at 25° C. by means of a Cannon automated capillary viscometer as described above. At 21.3° C., water (65.16 g) was added followed by epichlorohydrin (122.38 g) added over a 20 minute period of time, and the reaction was heated to 40° C. The reaction was held at that temperature for 180 minutes from the end of epichlorohydrin addition. After the 180 minutes water (61.08 g) was added to dilute the reaction to 45% Total solids and the reaction was then heated to 65° C. Once the reaction reached 53.6° C. concentrated sulfuric acid (4.2 g) was added to adjust the reaction pH to 5.56. The reaction was held at 65° C. until the reaction temperature had been >64° C. for 90 minutes. Material set aside for aging was adjusted to pH 5. Total solids=44.8%, Brookfield viscosity 78.5 cps. Brookfield viscosity was measured at 25° C. at 60 rpm with a #61 spindle using a Brookfield LV DV-II+ Pro.

|  | Aging at 25° C. | | Aging at 32° C. | |
| --- | --- | --- | --- | --- |
| Days | Visc | pH | Visc | pH |
| 0 | 78.5 | 5 | 78.5 | 5 |
| 7 | 93.6 | 5.14 | 116.5 |  |
| 14 | 123 |  | 152 |  |
| 21 | 129 |  | 155 |  |
| 42 | 174 | 4.9 | 234 | 4.84 |

The PAE resin of this example has high solids, low viscosity, and acceptable aging stability.

The invention claimed is:

1. A method of preparing an adhesive, the method comprising combining a PAE resin with a protein source,
   wherein the adhesive has a total solids content of greater than 45% by weight based on the total weight of the adhesive,
   wherein the combined solids content of the PAE resin and protein source comprises a least 45% of the total adhesive solids content,
   wherein the PAE resin has a solids content of greater than 40%, and
   wherein the PAE resin is characterized in that it has an aging stability of greater than one week at 32° C.

2. The method of claim 1 wherein the protein source comprises soy protein.

3. The method of claim 1 wherein the PAE resin has a viscosity at 40% solids of less than 200 cps.

4. The method of claim 1 wherein the PAE resin has a RSV of less than 0.3 dl/g.

5. The method of claim 1 wherein the PAE resin has an azetidinium level of greater than 0.75 meq.

6. The method of claim 1 wherein the viscosity of the adhesive is less than 10,000 cps.

7. The method of claim 1 wherein the adhesive has a total solids content of greater than 50% by weight based on the total weight of the adhesive.

8. The method of claim 1 wherein the combined solids content of the PAE resin and the protein source comprise at least 50% of the total adhesive solids content.

9. A method of preparing a composite the method comprising adding the adhesive of claim 1 to a suitable substrate.

10. The method of claim 9 wherein the protein source is a soy based material containing soy protein.

11. The method of claim 9 wherein the PAE resin has a viscosity at 40% solids of less than 200 cps and wherein the viscosity of the adhesive viscosity is less than 10,000 cps.

12. The method of claim 9 wherein the PAE resin has a RSV of 0.3 dl/g and an azetidinium level greater than 0.75 meq.

13. The method of claim 9 wherein the adhesive has a total solids content of greater than 50% by weight based on the total weight of the adhesive.

14. The method of claim 9 wherein the combined solids content of the PAE resin and the protein source comprise at least 50% of the total adhesive solids content.

15. The method of claim 9 wherein the composite is a wood based particle board.

16. The method of claim 15 wherein the protein source is a soy based material containing soy protein, the adhesive has a viscosity at 40% solids of less than 200 cps, the PAE resin has a RSV below 0.3 dl/g, the PAE resin has an azetidinium level greater than 0.75 meq and the adhesive viscosity is below 10,000 cps.

17. The method of claim 9 wherein the composite is a wood based fiber board.

18. The method of claim 17 wherein the protein source is a soy based material containing soy protein, the adhesive has a viscosity at 40% solids of less than 200 cps, the PAE resin has a RSV below 0.3 dl/g, the PAE resin has an azetidinium level greater than 0.75 meq and the adhesive viscosity is below 10,000 cps.

19. An adhesive composition comprising a PAE resin and a protein source,
   wherein the adhesive has a total solids content of greater than 45% by weight based on the total weight of the adhesive,
   wherein the combined solids content of the PAE resin and protein source comprises at least 45% of the total adhesive solids content,
   wherein the PAE resin has a solids content of greater than 40%, and
   wherein the PAE resin is characterized in that it has an aging stability of greater than one week at 32° C.

20. The adhesive according to claim 19, wherein the PAE resin has a solids level of greater than 40%, an LV Brookfield viscosity of less than 200 cps, an azetidinium level of greater than 0.75 meq/g, a RSV of less than 0.3 dl/g and stability of greater than one week at 32° C.

21. The adhesive of claim 19, wherein the protein source comprises soy protein.

22. The adhesive of claim 19, wherein the PAE resin has a viscosity at 40% solids of less than 200 cps.

23. The adhesive of claim 19, wherein the PAE resin has a RSV of less than 0.3 dl/g.

24. The adhesive of claim 19, wherein the PAE resin has an azetidinium level of greater than 0.75 meg.

25. The adhesive of claim 19, wherein the viscosity of the adhesive is less than 10,000 cps.

26. The adhesive of claim 19, wherein the adhesive has a total solids content of greater than 50% by weight based on the total weight of the adhesive.

27. The adhesive of claim 19, wherein the combined solids content of the PAE resin and the protein source comprise at least 50% of the total adhesive solids content.

\* \* \* \* \*